Figure 1:
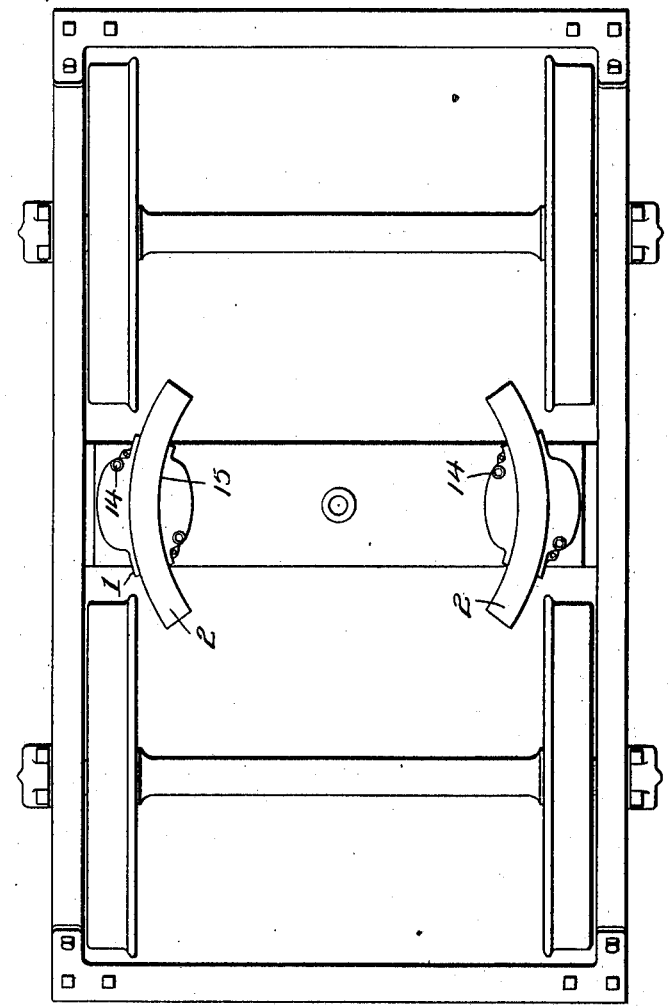

O. G. COSBY.
BEARING.
APPLICATION FILED APR. 13, 1910.

978,115.

Patented Dec. 6, 1910.
2 SHEETS—SHEET 1.

Witnesses
F. C. Gibson.
D. W. Gould.

Inventor
Oscar G. Cosby.
By Victor J. Evans
Attorney

O. G. COSBY.
BEARING.
APPLICATION FILED APR. 13, 1910.
978,115.
Patented Dec. 6, 1910.
2 SHEETS—SHEET 2.
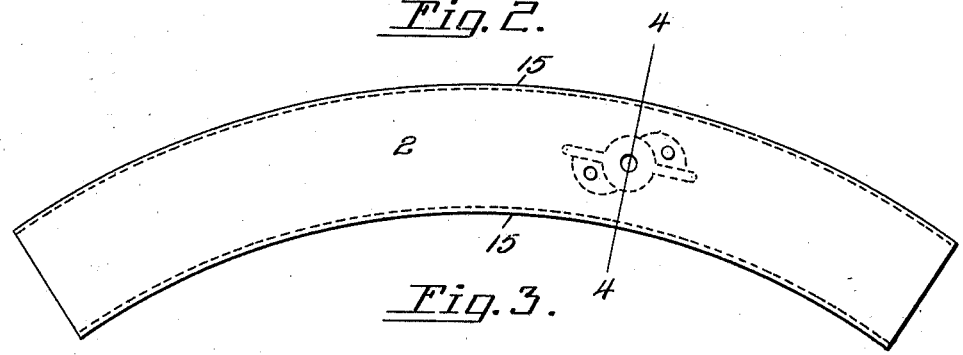
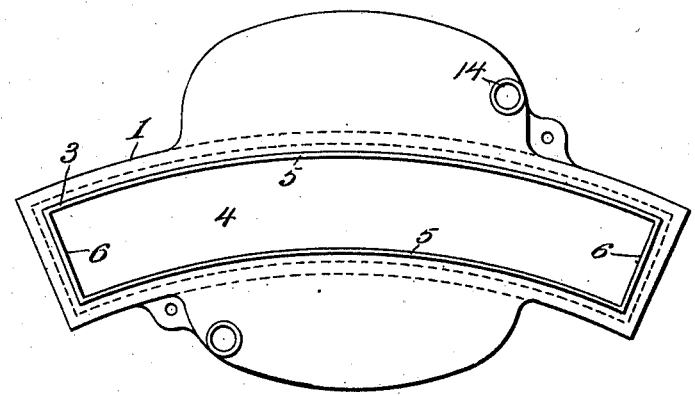
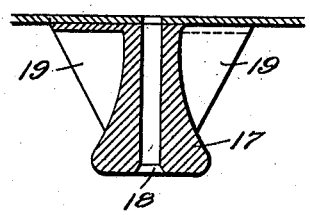
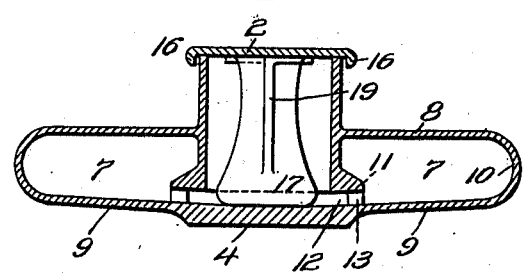
Witnesses
F. C. Gibson.
D. W. Gould.
Inventor
Oscar G. Cosby.
By Victor J. Evans
Attorney
THE NORRIS PETERS CO., WASHINGTON, D. C.

UNITED STATES PATENT OFFICE.

OSCAR GARLAND COSBY, OF HAMPTON, VIRGINIA, ASSIGNOR OF FORTY-NINE ONE-HUNDREDTHS TO FRANCIS F. CAUSEY, OF HAMPTON, VIRGINIA.

BEARING.

978,115.      Specification of Letters Patent.      Patented Dec. 6, 1910.

Application filed April 13, 1910. Serial No. 555,126.

*To all whom it may concern:*

Be it known that I, OSCAR GARLAND COSBY, a citizen of the United States, residing at Hampton, in the county of Elizabeth City and State of Virginia, have invented new and useful Improvements in Bearings, of which the following is a specification.

The invention relates to an improvement in bearings designed more particularly for use as side bearings for trucks, which may be more specifically described as a slide bearing, and in its essential features the invention is directed to a means for the automatic lubrication of such side bearings and for the automatic control of the distribution of the lubricant.

The main object of the present invention is the provision of a side bearing in which the female member or truck plate is provided with one or more reservoirs in open communication with the bearing recess in said member, the construction including the provision of a channel whereby the reservoirs are in communication with each other independently of the bearing recess.

The invention will be described in the following specification, reference being had particularly to the accompanying drawings, in which:—

Figure 1 is a plan illustrating the application of the improved bearing to a truck. Fig. 2 is a top plan view of the male member or upper plate of the bearing. Fig. 3 is a similar view of the truck plate or female member of the bearing. Fig. 4 is a transverse sectional view of the male member on the line 4—4 of Fig. 2. Fig. 5 is a transverse sectional view of the completed bearing with all parts in assembled relation.

Referring particularly to the accompanying drawings, the improved bearing comprises in general structure, as is usual in such bearings a female member or truck 1, designed for connection in any usual or preferred manner to the truck, and an upper plate or male member 2 designed for connection to the vehicle body.

The truck plate or female member of the bearing is formed to provide a body 3 including a bottom 4, spaced parallel walls 5, and end walls 6. The side walls 5 are curved throughout their lengths, corresponding in this respect to the usual plane of movement of the trucks in their side play. The body thus formed is open at the top, and the bottom 4 is of substantial thickness, its upper surface being utilized as a bearing surface.

Integral with the body 3 and projecting laterally therefrom are reservoirs 7, said reservoirs being preferably of duplicate construction and disposed in alinement transverse the body. Each reservoir is completely inclosed including upper and lower walls 8 and 9 and an outer side wall 10, a portion of the side wall 5 of the body being used to complete the formation of each reservoir. The bottom walls 9 of the reservoirs are, at their juncture with the side edges of the bottom wall 4 of the body in approximately horizontal alinement with said bottom, and from this point said bottom walls 9 incline upwardly and outwardly, whereby a gravity feed is imparted to the oil within the reservoir.

That portion of the side walls 5 of the body immediately above the bottom 4, and included with the plane of the reservoirs, and also the similar portion of the end walls 6, are thickened as at 11 and in this thickened portion there is formed an unbroken recess 12 in open communication with the bearing recess included between the side walls. The recess 12 thus extends entirely around the body being offset from the bearing recess, and at determinate points within the plane of the reservoir, the thickened portion 11 within the plane of the reservoirs is formed with one or more openings 13, whereby the lubricant within the reservoirs may be directed into the recess or channel 12 and thence into the bearing recess. The top walls 8 of the reservoirs are formed at appropriate points with filling openings 14 which may be closed by caps or in any other desired manner.

The upper plate or male member 2 comprises a section of appropriate material of materially greater length than the similar dimension of the body of the truck plate and having its side edges 15 conforming in curvature to the curvature of the side walls 5 of the body 3. The side edges 15 of the upper plate are projected downwardly from the normal plane of said plate to provide what may be termed side flanges 16, which when the bearing members are in connected relation are designed to cover and protect the interior parts of the lower bearing and thereby prevent the introduction of dust, mud or any other matter into the female bearing in the travel of the vehicle. The said flanges are preferably spaced sufficiently distant from the lateral edges of the female member to afford ample play in the operation of the bearing. At an appropriate point there is secured to the upper plate a depending bearing block 17, which block is either integral with said upper plate or removably secured in place by screw bolts or other fastenings 18. The bearing block 17 is preferably circular at the top and bottom, conforming in curvature with the recess of the female bearing, the bottom surface being however of greater diameter than the upper surface, so that the block is of gradually increasing diameter throughout its length, to the bottom surface, which forms the bearing surface of a diameter somewhat less than the width of the bearing recess in the bottom 4. Webs 19 are utilized to brace the block from the upper plate. In the above connection it is to be understood that the particular form of bearing block herein described and shown may be varied as conditions warrant, and that I contemplate the use of more than one such bearing block, if desired, or the use of a bearing block of any single length or commensurate with the length of the body, or of a bearing block having any sectional formation or contour or dimension.

In connection with the construction described there are several important features which form the gist of the present invention; it will be particularly noted that the walls 5 of the body are of a height materially greater than the similar dimension of the reservoirs. By this construction it will be at once apparent that it is impossible for such quantity of oil to be fed to the bearing as will cause the oil to flow over the edges of the body. Again the reservoirs are in communication with the bearing recess through the channel 12 and openings 13, and that therefore it will be plainly evident that the respective reservoirs are in communication with each other independently of the bearing recess. This feature is particularly important as it tends to provide perfect communication between the reservoirs thereby insuring such inter flow and circulation of the lubricant between the reservoir as will tend to maintain a perfect distribution to the bearing and at the same time automatically equalize the lubricant in the reservoirs. The equalization of lubricant as to quantity is essential, as it prevents the excessive discharge of lubricant from one reservoir in the tilting of the bearing without a corresponding recharge from the other reservoir when the level of the bearing is restored. The flanges 16 of the upper plate serve to protect the female member from mud, dust or other foreign substances. The inclination of the bottom walls 9 of the reservoirs insures a gravity feed of the lubricant to the bearing under all conditions of the latter, thereby providing for a flow of lubricant to the bearing until the quantity in the reservoir is completely exhausted.

It is to be understood of course that aside from the details herein described the various parts of the bearing plates, such for example, as the means for securing them in their respective places is to be of any conventional or desired type, and that in addition to their uses with side bearings, I contemplate the use of the improvements described herein for any bearings for which they may be adapted, such for example as a fifth wheel or the like.

Having thus described the invention what is claimed as new, is:—

1. The combination with a slide bearing of a plurality of reservoirs in open communication therewith and with each other through the bearing.

2. The combination with a slide bearing, of a plurality of reservoirs in open communication therewith and with each other through the bearing, said reservoirs being formed for a gravity feed.

3. The combination with a slide bearing of a plurality of reservoirs in open communication therewith, the upper edges of the female portion of the bearing being above the possible height of lubricant in the reservoir.

4. The combination with a slide bearing, of a plurality of reservoirs in open communication with the lower portion of the bearing, the upper edges of the oil confining space of the bearing being above the possible height of lubricant in the reservoir.

5. A side bearing or slide bearing including a body formed to provide a bearing recess, said body being formed with an endless channel offset from and in communication with the recess, and a plurality of reservoirs in open communication with the channel.

6. A side bearing or slide bearing including a body formed to provide a bearing recess, having a reservoir in communication with the recess, and an upper plate designed to overhang the body and formed with depending flanges to cover the side walls of the body.

7. A side bearing or slide bearing including a body comprising curved parallel side walls, said body being formed with an endless channel in communication with the recess and offset therefrom, and a plurality of wholly inclosed reservoirs in communication with the channel, said reservoirs having a height less than the corresponding dimension of the side walls.

8. A side bearing or slide bearing including a body comprising curved parallel side walls, said body being formed with an endless channel in communication with the recess and offset therefrom, and a plurality of wholly inclosed reservoirs in communication with the channel, said reservoirs having a height less than the corresponding dimension of the side walls, the bottoms of the reservoirs inclining downwardly toward the bearing recess.

9. A side bearing or slide bearing including a body formed to provide a bearing recess and formed with a channel communicating with and offset from the recess, having reservoirs integral with the body and communicating with the channel, and an upper plate designed to overlie and close the upper part of the body, said plate being formed with depending edge flanges to cover the body, and a bearing block depending from the plate and movable within the bearing recess.

10. A side bearing or slide bearing including a body formed to provide a bearing recess and formed with a channel communicating with and offset from the recess having a plurality of reservoirs integral with the body and each reservoir communicating with the channel by a plurality of oil drains, said drains declining inward and downward from the interior bottoms of the reservoirs to said channel.

In testimony whereof I affix my signature in presence of two witnesses.

OSCAR GARLAND COSBY.

Witnesses:
 A. L. MANN,
 E. L. DUNN.